(12) United States Patent
Sakai

(10) Patent No.: US 9,988,078 B2
(45) Date of Patent: Jun. 5, 2018

(54) STEERING CONTROL APPARATUS

(71) Applicant: JTEKT CORPORATION, Osaka-shi, Osaka (JP)

(72) Inventor: Atsuo Sakai, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 21 days.

(21) Appl. No.: 15/288,408

(22) Filed: Oct. 7, 2016

(65) Prior Publication Data

US 2017/0106900 A1 Apr. 20, 2017

(30) Foreign Application Priority Data

Oct. 15, 2015 (JP) .................................. 2015-203991

(51) Int. Cl.
| | |
|---|---|
| *B62D 5/04* | (2006.01) |
| *B62D 6/00* | (2006.01) |
| *B62D 3/12* | (2006.01) |

(52) U.S. Cl.
CPC ............ *B62D 5/0484* (2013.01); *B62D 3/12* (2013.01); *B62D 6/00* (2013.01); *B62D 6/002* (2013.01); *B62D 5/0403* (2013.01); *B62D 5/0421* (2013.01); *B62D 5/0427* (2013.01); *B62D 5/0442* (2013.01)

(58) Field of Classification Search
None
See application file for complete search history.

(56) References Cited

U.S. PATENT DOCUMENTS

| | | | | |
|---|---|---|---|---|
| 7,325,644 B2* | 2/2008 | Sakai | ................... | B62D 5/0469 180/402 |
| 9,815,491 B2* | 11/2017 | Aono | ................... | B62D 5/0463 |
| 2004/0245041 A1* | 12/2004 | Fukuda | ................ | B62D 5/0427 180/444 |
| 2010/0181140 A1* | 7/2010 | Tomita | ................... | B62D 5/046 180/446 |
| 2013/0245890 A1* | 9/2013 | Kageyama | ............... | B62D 7/18 701/41 |
| 2014/0008141 A1* | 1/2014 | Kageyama | ............... | B62D 5/00 180/400 |

FOREIGN PATENT DOCUMENTS

JP 2009-236297 A 10/2009

OTHER PUBLICATIONS

Feb. 21, 2017 Extended Search Report issued in European Patent Application No. EP16193555.6.

\* cited by examiner

*Primary Examiner* — Redhwan K Mawari
*Assistant Examiner* — Edward Torchinsky
(74) *Attorney, Agent, or Firm* — Oliff PLC

(57) ABSTRACT

A steering control apparatus is provided which allows mitigation of an adverse effect of a technique for fixing a regulation member to a vehicle body on a phenomenon resulting from execution of steering operation control on steered wheels. An axial-force acquisition processing circuit calculates a rack axial force based on currents iu, iv, and iw flowing through a steering operation motor. A correction processing circuit corrects a target steered angle based on the rack axial force to obtain a target steered angle. A steered angle control processing circuit calculates a torque command value as the amount of operation for adjusting a steered angle to the target steered angle through feedback control. An operation signal generation processing circuit controllably adjusts a torque of a steering operation motor to the torque command value.

12 Claims, 13 Drawing Sheets

STEERING CONTROL APPARATUS

INCORPORATION BY REFERENCE

The disclosure of Japanese Patent Application No. 2015-203991 filed on Oct. 15, 2015 including the specification, drawings and abstract, is incorporated herein by reference in its entirety.

BACKGROUND OF THE INVENTION

1. Field of the Invention

The invention relates to a steering control apparatus intended to operate a steering system including a steering operation actuator that steers steered wheels of a vehicle by displacing a rack shaft in an axial direction relative to a regulation member fixed to a vehicle body to regulate displacement of the rack shaft in a direction crossing an axial direction while permitting relative displacement of the rack shaft in the axial direction.

2. Description of the Related Art

For example, Japanese Patent Application Publication No. 2009-236297 (JP 2009-236297 A) proposes a steering gearbox that is fixed to a vehicle body utilizing a rubber mount bush and that regulates displacement of a rack shaft in a direction crossing an axial direction while permitting relative displacement of the rack shaft in the axial direction. Specifically, JP 2009-236297 A discloses that the steering gearbox is elastically supported on the vehicle body by forming mounting holes in the steering gearbox at a plurality of positions, fitting mount bushes in the mounting holes, inserting bolts into the mount bushes, and fastening the bolts to the vehicle body. Regulation members may be defined as those of the steering gearboxes which are structured to combine with an element that regulates displacement of the rack shaft in the direction crossing the axial direction while permitting relative displacement of the rack shaft in the axial direction.

The steering system steers steered wheels of the vehicle by displacing the rack shaft relative to the steering gearbox in the axial direction. Thus, a steering control apparatus intended to operate the above-described steering system by performing steering operation control on the steered wheels can control the steered angle of the steered wheels by controlling the relative displacement of the rack shaft relative to the steering gearbox in the axial direction. However, when the steering gearbox is elastically supported on the vehicle body using the mount bushes as described above, the steering gearbox itself may be displaced relative to the vehicle body in the axial direction due to elasticity of the mount bushes. In this case, a difference equal to the displacement of the steering gearbox relative to the vehicle body is present between the relative displacement of the rack shaft relative to the steering gearbox in the axial direction and the relative displacement of the rack shaft relative to the vehicle body in the axial direction. The difference may act as an error in control of the steered angle of the steered wheels when the steered angle is controlled by controlling the relative displacement of the rack shaft relative to the steering gearbox in the axial direction.

On the other hand, when mounted to the vehicle body, the steering gearbox may be firmly fixed directly to the vehicle body without using the rubber mount bushes. In that case, an error in control of the steered angle of the steered wheels can be suppressed even when the steered angle is controlled by controlling the relative displacement of the rack shaft relative to the steering gearbox. However, in that case, users' needs are not always met; when the steered wheels are steered through a large angle, impact is likely to be transmitted to the vehicle. Consequently, a phenomenon resulting from execution of steering operation control on the steered wheels is significantly affected by a technique for fixing the regulation member in the steering gearbox to the vehicle body.

SUMMARY OF THE INVENTION

An object of the invention is to provide a steering control apparatus that allows mitigation of an adverse effect of a technique for fixing a regulation member to a vehicle body on a phenomenon resulting from execution of steering operation control of steered wheels.

An aspect of the invention provides a steering control apparatus intended to operate a steering system including a steering operation actuator that steers steered wheels of a vehicle by displacing a rack shaft in an axial direction relative to a regulation member. The regulation member is fixed to a vehicle body to regulate displacement of the rack shaft in a direction crossing the axial direction while permitting relative displacement of the rack shaft in the axial direction. The steering control apparatus includes:

a target value setting processing circuit that sets a target value for relative displacement of the rack shaft relative to the regulation member in the axial direction;

an axial-force acquisition processing circuit that acquires a rack axial force acting as a load imposed on the rack shaft in the axial direction;

a correction processing circuit that corrects the target value based on the rack axial force acquired by the axial-force acquisition processing circuit; and a steering operation processing circuit that operates the steering operation actuator in order to control relative displacement of the rack shaft relative to the regulation member in the axial direction so that the displacement is equal to the target value corrected by the correction processing circuit. The steering operation actuator includes a steering operation motor that displaces the rack shaft relative to the regulation member in the axial direction.

In this aspect, the correction processing circuit corrects the target value set by the target value setting processing circuit based on the rack axial force acquired by the axial-force acquisition processing circuit, and the steering operation processing circuit controllably adjusts the relative displacement to the corrected target value. Since the steering operation processing circuit controllably adjusts the relative displacement to the corrected target value, an adverse effect of a technique for fixing the regulation member to the vehicle body is difficult to be directly reflected in behavior of the vehicle, compared to the case where the steering operation processing circuit directly controllably adjusts the relative displacement to the target value set by the target value setting processing circuit. Therefore, the above-described configuration allows mitigation of the adverse effect of the technique for fixing the regulation member to the vehicle body on the phenomenon resulting from execution of steering operation control of the steered wheels.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
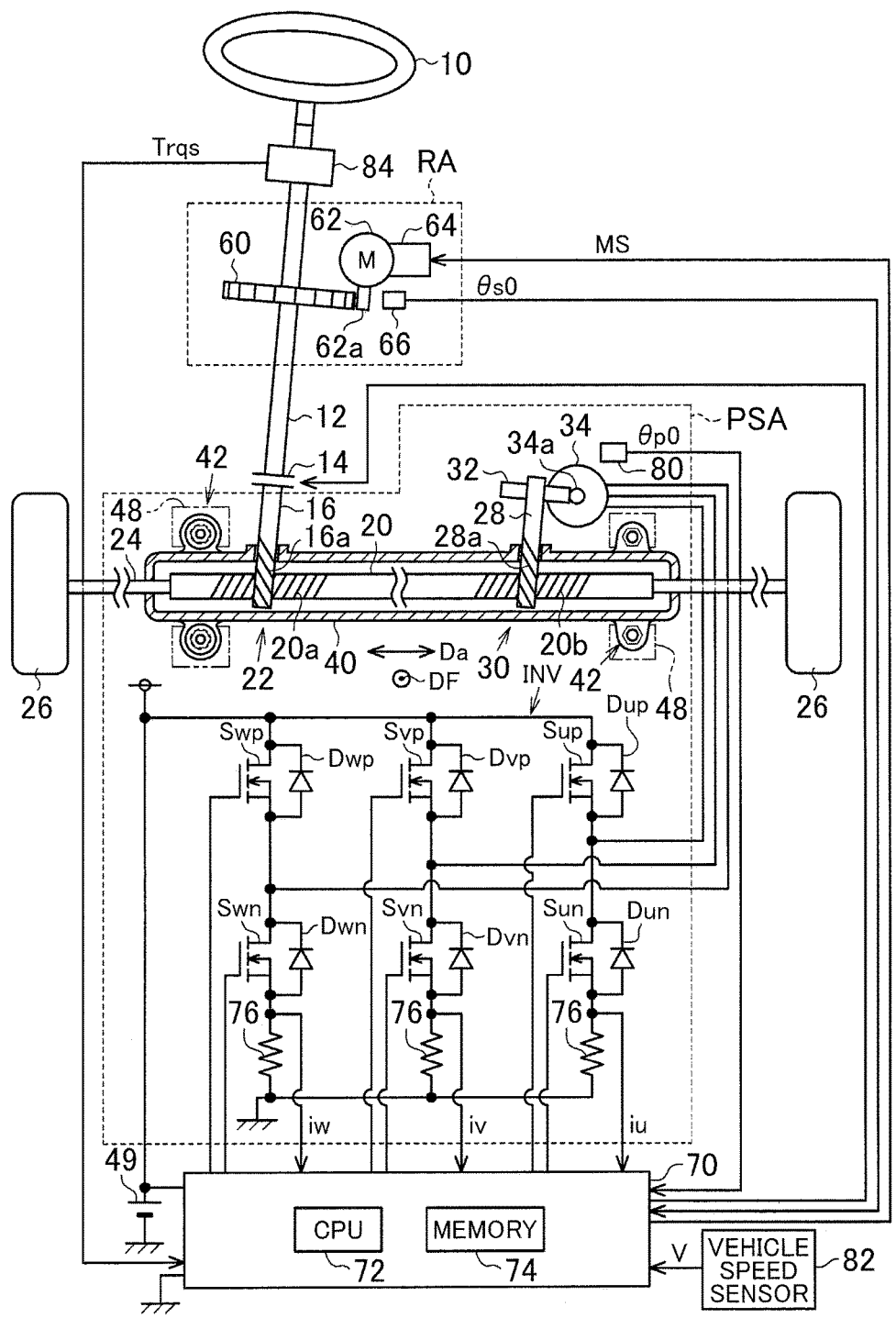
FIG. 1 is a diagram depicting a steering control apparatus and a steering system according to a first embodiment.

A first embodiment of a steering control apparatus in the invention will be described below with reference to the drawings. As depicted in FIG. 1, in a steering system according to the present embodiment, a steering wheel 10 is fixed to a steering shaft 12, and the steering shaft 12 can be coupled to a pinion shaft 16 via an electronically controlled clutch 14.

The pinion shaft 16 is arranged to be able to transmit power to a rack shaft 20 of a steering operation actuator PSA. Specifically, the rack shaft 20 and the pinion shaft 16 are arranged at a predetermined crossed axes angle. First rack teeth 20a formed on the rack shaft 20 mesh with pinion teeth 16a formed on the pinion shaft 16 to provide a first rack-and-pinion mechanism 22. Tie rods 24 are coupled to opposite ends of the rack shaft 20, and tips of the tie rods 24 are coupled to knuckles not depicted in the drawings and to which steered wheels 26 are assembled. Therefore, the first rack-and-pinion mechanism 22 converts rotation of the steering shaft 12 resulting from operation of the steering wheel 10 into displacement of the rack shaft 20 in an axial direction Da. The displacement in the axial direction Da is transmitted to the knuckles via the tie rods 24 to vary the steered angle of the steered wheels 26, that is, a traveling direction of the vehicle.

The rack shaft 20 is arranged at the predetermined crossed axes angle to the pinion shaft 28. Second rack teeth 20b formed on the rack shaft 20 mesh with pinion teeth 28a formed on the pinion shaft 28 to provide a second rack-and-pinion mechanism 30. The pinion shaft 28 is connected to a rotating shaft 34a of a steering operation motor 34 via a steering operation reduction gear 32 such as a worm-and-wheel reduction gear. The steering operation motor 34 is a three-phase surface permanent magnet synchronous motor (SPMSM).

The rack shaft 20 is housed in a regulation member structured to combine with an element that regulate displacement of the rack shaft 20 in a direction crossing the axial direction Da while permitting relative displacement of the rack shaft 20 in the axial direction Da. In other words, the regulation member includes a housing 40, the pinion shaft 16, the pinion shaft 28, and a rack guide (not depicted in the drawings) that guides the rack shaft 20 in the axial direction. The housing 40 is fixed to the vehicle body (a suspension member 48 is illustrated herein) with mount portions 42 provided at opposite ends of the housing 40 in the axial direction Da.

Figure 2:
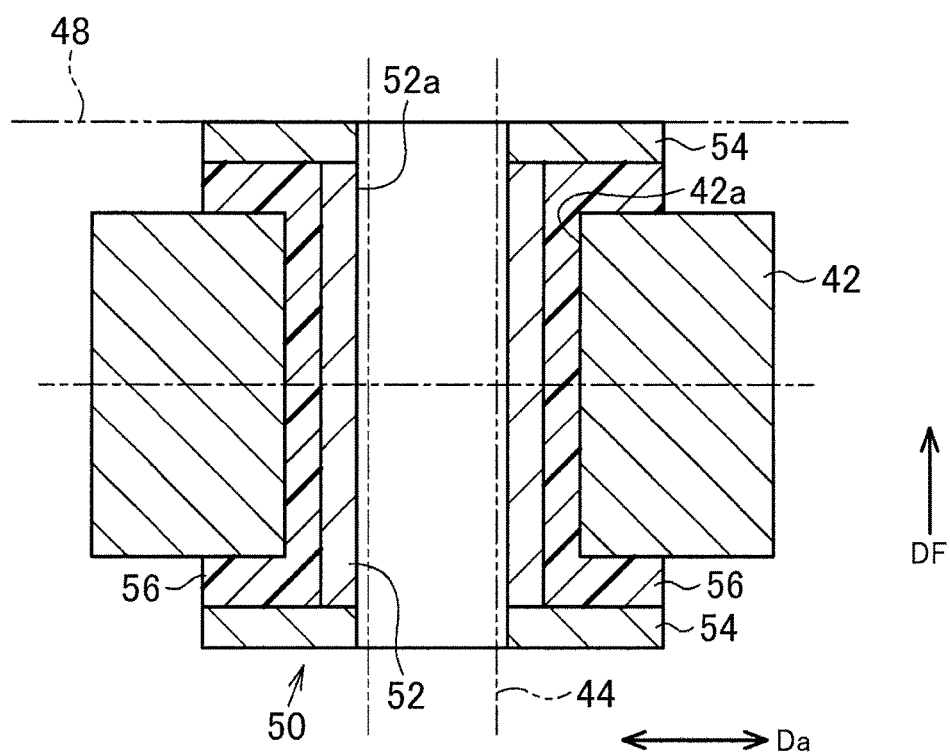
FIG. 2 is a sectional view depicting a sectional configuration of a mount portion of a housing according to the first embodiment.

FIG. 2 depicts a section of the mount portion 42. As depicted in FIG. 2, the mount portion 42 is fastened and fixed to the suspension member 48 via a bush 50. The bush 50 includes a tubular portion 52, flange portions 54, and a rubber 56. The rubber 56 and the tubular portion 52 are inserted in an inner peripheral surface 42a of a hole penetrating the mount portion 42 with a radially outer side of the tubular portion 52 covered with the rubber 56. For both the rubber 56 and the tubular portion 52, opposite ends thereof stick out from the inner peripheral surface 42a of the mount portion 42. The stick-out portions of the rubber 56 extend outward of the tubular portion 52 in the radial direction. On the other hand, the flange portions 54 are provided in the portions of the bush 50 sticking out from the inner peripheral surface 42a of the mount portion 42 and on opposite sides in a direction parallel to a direction DF toward the suspension member 48.

The flange portions 54 extend outward of the tubular portion 52 in the radial direction so as to follow the rubber 56. The tubular portion 52 and the flange portions 54 are rigid bodies that are hard solids such as metal, polycrystalline substances having both an appropriate hardness and an appropriate strength, or the like.

A fastening member 44 is inserted in an inner peripheral surface 52a of a hole penetrating the tubular portion 52 and the flange portions 54 to fasten the mount portion 42 to the suspension member 48. Thus, the mount portion 42 (housing 40) is elastically supported on the suspension member 48.

As seen back in FIG. 1, the steering operation motor 34 is connected to a battery 49 via an inverter INV. The inverter INV is a circuit that electrically connects and disconnects each of a positive electrode and a negative electrode of a battery 49 to and from each of three terminals of the steering operation motor 34.

In FIG. 1, of the MOS field effect transistors (switching elements) included in the inverter INV, MOS field effect transistors connected to the three terminals of the steering operation motor 34 are denoted with reference characters including u, v, and w, respectively. Character p is added to the reference characters for MOS field effect transistors on an upper arm, and character n is added to the reference characters for MOS field effect transistors on a lower arm. In the description below, u, v, and w are collectively denoted as ¥, and p and n are collectively denoted as #. That is, the inverter INV includes a series connection body having switching elements S¥p that electrically connect and disconnect the positive electrode of the battery 49 to and from each of the terminals of the steering operation motor 34 and switching elements S¥n that electrically connect and disconnect the negative electrode of the battery 49 to and from each of the terminals of the steering operation motor 34. Diodes D¥# are connected in anti-parallel with the switching elements S¥#.

A reaction force actuator RA is connected to the steering shaft 12 to apply a reaction force that is a force resisting operation of the steering wheel 10, to the steering shaft 12. The reaction force actuator RA includes a reaction force reduction gear 60, a reaction force motor 62 with a rotating shaft 62a coupled to the reaction force reduction gear 60, and an inverter 64 that drives the reaction force motor 62.

The steering control apparatus (control apparatus 70) includes a central processing unit (CPU 72) and a memory 74. The control apparatus 70 performs control in which the steered angle of the steered wheels 26 or the reaction force applied to the steering wheel 10 is used as a control amount. In this case, the control apparatus 70 references detection values from various sensors. The sensors include, for example, a rotation angle sensor 80 that detects a rotation angle $\theta p0$ of the rotating shaft 34a of the steering operation motor 34, a rotation angle sensor 66 that detects a rotation angle $\theta s0$ of the rotating shaft 62a of the reaction force motor 62, and a torque sensor 84 that detects a torque (steering torque Trqs) applied to the steering shaft 12. The sensors also include a vehicle speed sensor 82 that detects a traveling speed of the vehicle (vehicle speed V). The control apparatus 70 acquires and references currents iu, iv, and iw based on voltage drops at shunt resistors 76 connected to sources of the switching elements Sun, Svn, and Swn. In FIG. 1, the rack shaft 20, the pinion shaft 28, the steering operation reduction gear 32, the steering operation motor 34, and the inverter INV are enclosed by a dashed line to indicate that these components are included in the steering operation actuator PSA.

Figure 3:
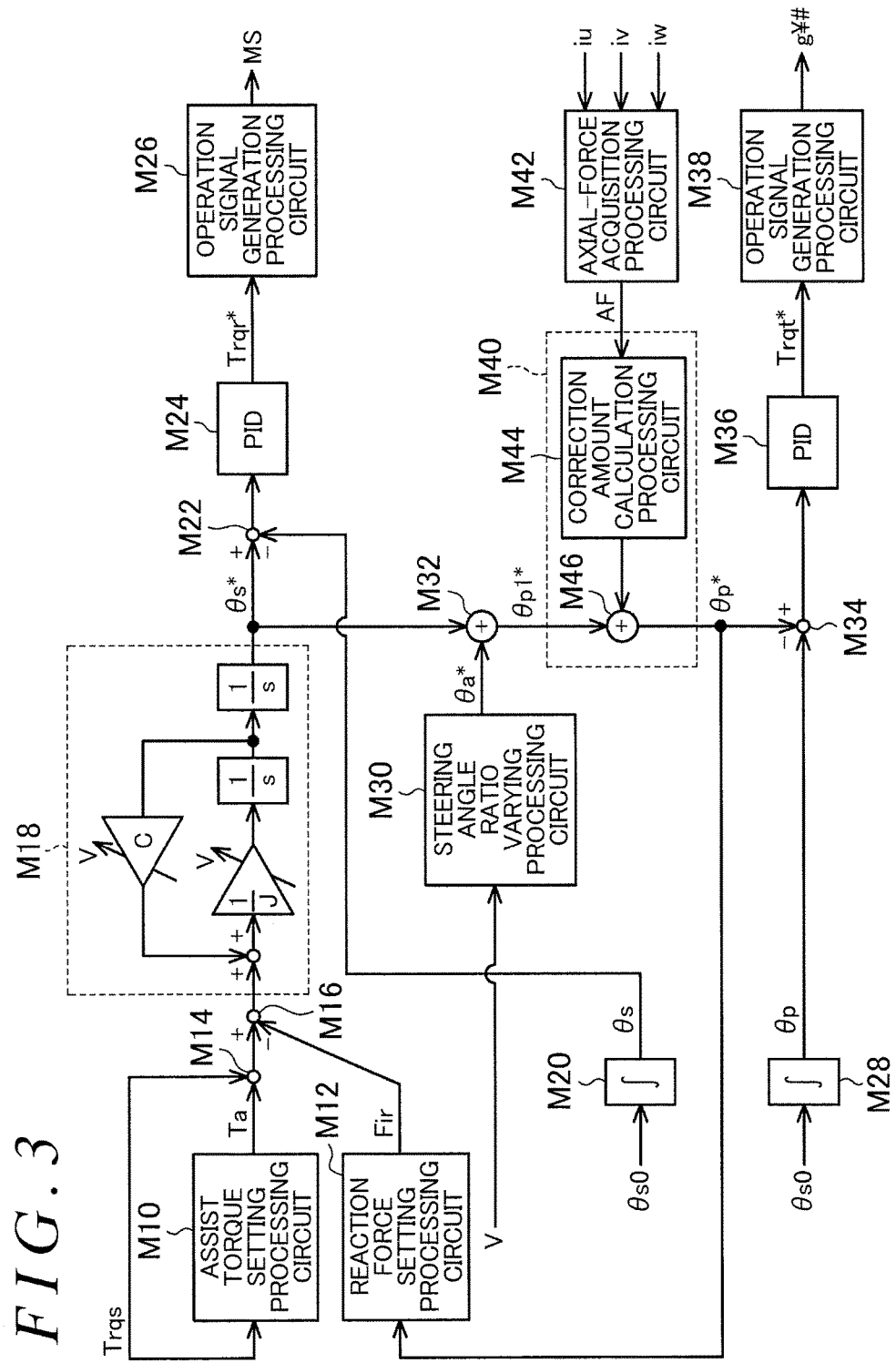
FIG. 3 is a block diagram depicting a part of processing executed by the steering control apparatus according to the first embodiment.

FIG. 3 illustrates a part of processing executed by the control apparatus 70. FIG. 3 illustrates processing implemented by the CPU 72 executing a program stored in the memory 74, according to the type of process. The processing illustrated in FIG. 3 is executed while power transmission between the steering wheel 10 and the steered wheels 26 is blocked by the clutch 14.

An assist torque setting processing circuit M10 calculates an assist torque Ta based on the steering torque Trqs detected by the torque sensor 84. A value to which the assist torque Ta is set increases as the steering torque Trqs increases.

An addition processing circuit M14 outputs a value resulting from addition of the steering torque Trqs to the assist torque Ta. A reaction force setting processing circuit M12 sets a reaction force Fir corresponding to operation of the steering wheel 10. In the present embodiment, the reaction force Fir is set based on a target steered angle $\theta p^*$ described below.

A deviation calculation processing circuit M16 outputs a value resulting from subtraction of the reaction force Fir from an output value from the addition processing circuit M14. A target angle setting processing circuit M18 sets a target steering angle $\theta s^*$ based on an output value from the deviation calculation processing circuit M16. In this case, a model formula is utilized which is expressed by Equation (c1) that associates an output value Ff from the deviation calculation processing circuit M16 with the target steering angle $\theta s^*$.

$$Ff = C \cdot \theta s^{*\prime} + J \cdot \theta s^{*\prime\prime} \qquad (c1)$$

A first-order derivative of $\theta s^*$ in relation to time is denoted by $\theta s^{*\prime}$, and a second-order derivative of $\theta s^*$ in relation to time is denoted by $\theta s^{*\prime\prime}$. A model expressed by Equation (c1) is a model that specifies, for the steering wheel 10 and the steered wheels 26 mechanically coupled together, a relationship between the torque of the rotating shaft rotating in conjunction with rotation of the steering wheel 10 and the rotation angle. In Equation (c1), a coefficient of viscosity C is a modeled friction and the like in the steering system, and a coefficient of inertia J is a modeled inertia in the steering system. The coefficient of viscosity C and the coefficient of inertia J can be variably set according to the vehicle speed V.

An integration processing circuit M20 converts a rotation angle $\theta s0$ detected by the rotation angle sensor 66 into a numerical value for an angular region larger than a range from 0° to 360°, which corresponds to a steering angle $\theta s$. That is, for example, when the steering wheel 10 is operated so as to maximally rotate clockwise or counterclockwise from a neutral position at which the vehicle travels straight ahead, the rotating shaft 62a makes a plurality of rotations. Therefore, when, with the steering wheel 10 in the neutral position, the rotating shaft 62a makes two rotations in a predetermined direction, the integration processing circuit M20 sets the steering angle $\theta s$ to 720°. The integration processing circuit M20 sets the steering angle $\theta s$ at the neutral position to zero.

A deviation calculation processing circuit M22 outputs a value resulting from subtraction of the steering angle $\theta s$ from the target steering angle $\theta s^*$. A steering angle control processing circuit M24 sets a reaction torque Trqr* that is a command value for a torque generated by the reaction force motor 62, as the amount of operation for adjusting the steering angle $\theta s$ to the target steering angle $\theta s^*$ through feedback control. Specifically, the reaction force torque Trqr* is the sum of output values from a proportional element, an integral element, and a derivative element to which the value resulting from subtraction of the steering angle $\theta s$ from the target steering angle $\theta s^*$ is input.

An operation signal generation processing circuit M26 generates an operation signal for the inverter 64 based on the reaction force torque Trqr* to output the operation signal MS. This can be implemented by well-known current feedback control in which a command value for a q axis is set based on the reaction force torque Trqr* and in which a voltage command value for a dq axis is set as the amount of operation for adjusting a current for the dq axis to the command value through feedback control. The d axis current may be controllably adjusted to zero. However, when the reaction force motor 62 has a high rotation speed, field weakening control may be executed with the absolute value of the d axis current set to a value larger than zero. Of course, the absolute value of the d axis current may be set to a value larger than zero in a low rotation speed region.

An integration processing circuit M28 converts a rotation angle $\theta p0$ detected by the rotation angle sensor 80 into a numerical value for an angular region larger than a range from 0° to 360°, which corresponds to a steered angle $\theta p$. A steering angle ratio varying processing circuit M30 sets a target operation angle $\theta a^*$ for variably setting a ratio between the steering angle $\theta s$ and the steered angle $\theta p$ (control steering angle ratio) based on the vehicle speed V. An addition processing circuit M32 calculates a target steered angle $\theta p1^*$ by adding the target operation angle $\theta a^*$ to the target steering angle $\theta s^*$.

A deviation calculation processing circuit M34 outputs a value resulting from subtraction of the steered angle $\theta p$ from the target steered angle θp* calculated in accordance with the target steered angle θp1*. Based on an output value from the deviation calculation processing circuit M34, a steered angle control processing circuit M36 sets a torque command value Trqt* that is a command value for the torque generated by the steering operation motor 34, as the amount of operation for adjusting the steered angle θp to the target steered angle θp* through feedback control. Specifically, the torque command value Trqt* is the sum of output values from a proportional element, an integral element, and a derivative element to which the value resulting from subtraction of the steered angle θp from the target steered angle θp* is input.

An operation signal generation processing circuit M38 generates an operation signal gY# for the switching element SY# in the inverter INV based on the torque command value Trqt*. This can be executed similarly to a generating process for the operation signal MS executed by the operation signal generation processing circuit M26.

The steered angle θp is a parameter having a one-to-one correspondence relationship with the relative displacement of the rack shaft 20 relative to the housing 40 in the axial direction Da depicted in FIG. 1. Thus, even when the relative displacement of the rack shaft 20 relative to the housing 40 in the axial direction Da remains unchanged, an actual steered angle of the steered wheels 26 fails to be unambiguously determined when the housing 40 is displaced relative to the vehicle body (suspension member 48) in the axial direction Da. In other words, even when the steered angle θp is controllably made equal to the target steered angle θp*, the actual steered angle of the steered wheels 26 may deviate from an intended value. In this case, the relative displacement of the housing 40 relative to the suspension member 48 in the axial direction Da is caused by a load imposed on the rack shaft 20 in the axial direction Da (rack axial force AF).

That is, an increased rack axial force AF is transmitted to the pinion shaft 28 via the rack shaft 20 to apply a force to the pinion shaft 28 so as to displace the pinion shaft 28 in the axial direction Da. The force is exerted on the housing 40 via the pinion shaft 28. In the present embodiment, in the aspect depicted in FIG. 2, the housing 40 is elastically supported on the vehicle body (suspension member 48). Thus, when the force is applied to the housing 40 to displace the housing 40 in the axial direction Da, the housing 40 is displaced in the axial direction Da. That is, when the force in the axial direction Da is applied to the housing 40, a portion of the mount portion 42 on one side of the fastening member 44 in the axial direction Da moves closer to the tubular portion 52 while deforming the rubber 56. Consequently, the housing 40 is displaced relative to the fastening member 44 in the axial direction Da, and thus, the housing 40 is displaced relative to the vehicle body (suspension member 48) in the axial direction Da.

Thus, in the present embodiment, the target steered angle θp1* is corrected through feed-forward control according to the rack axial force AF to obtain the final target steered angle θp*. This will be described below in detail.

Figure 4:
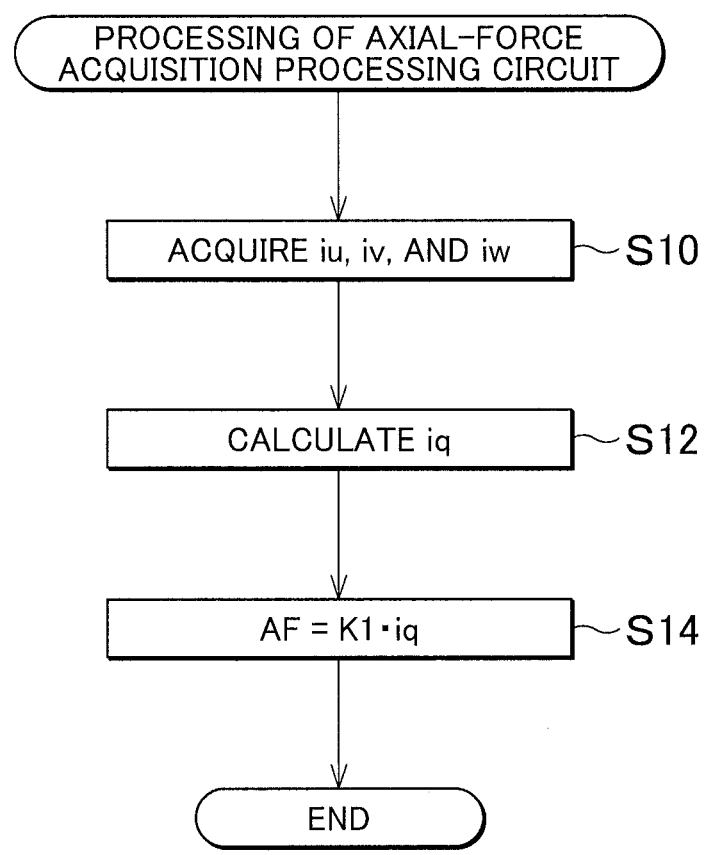
FIG. 4 is a flow diagram illustrating processing of an axial-force acquisition processing circuit according to the first embodiment.

An axial-force acquisition processing circuit M42 calculates the rack axial force AF based on currents iu, iv, and iw flowing through the steering operation motor 34. FIG. 4 illustrates processing executed by the axial-force acquisition processing circuit M42. This processing is repeatedly executed, for example, with a predetermined period by the axial-force acquisition processing circuit M42.

In the series of processes illustrated in FIG. 4, the axial-force acquisition processing circuit M42 acquires the currents iu, iv, and iw (S10). Then, the axial-force acquisition processing circuit M42 calculates a current iq for a q axis based on the currents iu, iv, and iw. This can be implemented by a process of conversion into a coordinate system with a d axis and a q axis that is a rotating coordinate system based on the rotation angle θp0 of the steering operation motor 34. Then, the axial-force acquisition processing circuit M42 calculates the rack axial force AF by multiplying the current iq for the q axis by a predetermined coefficient K1 (S14). The predetermined coefficient K1 is set based on a gear ratio of the steering operation reduction gear 32, a ratio between the torque of the pinion shaft 28 and the axial force of the rack shaft 20, and a torque constant. That is, the torque of the steering operation motor 34 is determined by multiplying the current iq for the q axis by the torque constant. The torque of the steering operation motor 34 is converted by the steering operation reduction gear 32 and the like, and the resultant torque is applied to the rack shaft 20. Thus, the current iq for the q axis is multiplied by the predetermined coefficient K1 to allow calculation of the axial force applied to the rack shaft 20 by the steering operation motor 34. In the present embodiment, the axial force is equal in absolute value to the rack axial force AF. That is, in the present embodiment, the control apparatus 70 controllably makes the steered angle θp equal to the target steered angle θp*, and for this control, an axial force K1·iq is applied to the rack shaft 20. Consequently, this axial force may be considered to be equal in absolute value to the rack axial force AF. Thus, when the rack axial force AF is positive and the predetermined coefficient is positive, the rack axial force may be considered to be K1·iq.

Upon completing the processing in step S14, the axial-force acquisition processing circuit M42 temporarily ends the processing in FIG. 4. As seen back in FIG. 3, the correction processing circuit M40 corrects the target steered angle θp1* to obtain the target steered angle θp* based on the rack axial force AF output by the axial-force acquisition processing circuit M42. Specifically, the correction processing circuit M40 includes a correction amount calculation processing circuit M44 that calculates a correction amount Δθ based on the rack axial force AF and an addition processing circuit M46 that calculates the target steered angle θp* by adding the correction amount Δθ to the target steered angle θp1*.

Figure 5:
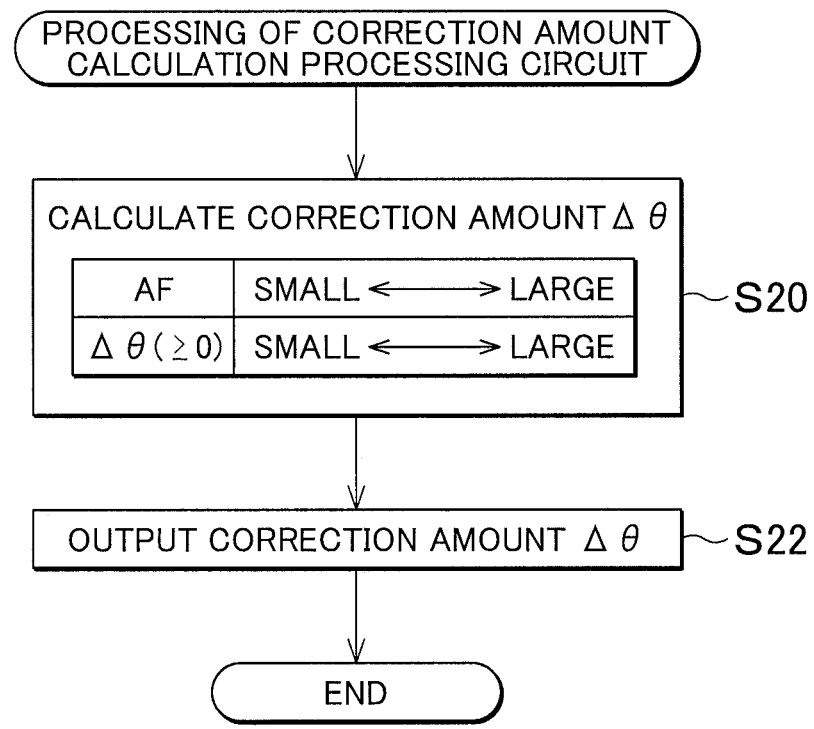
FIG. 5 is a flow diagram illustrating processing of a correction amount calculation processing circuit according to the first embodiment.

FIG. 5 illustrates processing of the correction amount calculation processing circuit M44. The correction amount calculation processing circuit M44 repeatedly executes the processing illustrated in FIG. 5 with a predetermined period. In the series of processes illustrated in FIG. 5, the correction amount calculation processing circuit M44 uses map data specifying a relationship between the rack axial force AF and the correction amount Δθ to calculate the correction amount Δθ based on the rack axial force AF calculated by the axial-force acquisition processing circuit M42 (S20). The map data is stored data on values of an output variable (correction amount Δθ) with respect to discrete values of an input variable (rack axial force AF). When one of the input variables is equal to the rack axial force AF, the correction amount calculation processing circuit M44 determines the corresponding value of the output variable to be the correction amount Δθ. When none of the input variables is equal to the rack axial force AF, the correction amount calculation processing circuit M44 calculates the correction amount Δθ through interpolation.

When the sign of the correction amount Δθ having such a value as to increase the rack axial force AF is defined to be positive, the map data specifies a larger value for the correction amount Δθ when the rack axial force AF has a large value than when the rack axial force AF has a small value. Thus, the value of the correction amount Δθ calculated by the correction amount calculation processing circuit M44 increases as the rack axial force AF increases. The correction amount Δθ is zero when the rack axial force AF is small.

The correction amount calculation processing circuit M44 outputs the calculated correction amount Δθ to an addition processing circuit M46 (S22). Upon completing the processing in step S22, the correction amount calculation processing circuit M44 temporarily ends the series of processes.

In the processing illustrated in FIG. 3, when, for example, the sign of the steered angle θp is reversed between a right turn and a left turn and the steered angle θp is positive during a right turn, the correction amount Δθ output by the correction amount calculation processing circuit M44 is negative when the correction amount Δθ has a value corresponding to the left turn.

Now, operation of the present embodiment will be described. For example, when the steering wheel 10 is turned sharply to the right, the steering operation motor 34 applies a torque to the rack shaft 20 so as to significantly displace the rack shaft 20 away from the neutral position in the axial direction Da. At this time, the rack axial force AF increases to apply a force to the housing 40 via the rack shaft 20 so as to displace the housing 40 relative to the vehicle body (suspension member 48). The housing 40 is thus displaced with respect to the vehicle body.

The control apparatus 70 calculates the correction amount Δθ according to the rack axial force AF and then calculates the final target steered angle θp* by adding the correction amount Δθ to the target steered angle θp1*. Then, the torque of the steering operation motor 34 is manipulated to set the steered angle θp to the target steered angle θp*. Thus, the relative displacement, from the neutral position, of the rack shaft 20 relative to the housing 40 in the axial direction Da is controllably adjusted to a larger value than when no correction is made using the correction amount Δθ.

A direction in which the housing is displaced relative to the vehicle body is opposite to a direction in which the rack shaft 20 is displaced relative to the housing 40. Thus, when the housing 40 is displaced relative to the vehicle body, a decrease in the relative displacement of the rack shaft 20 relative to the vehicle body in the axial direction Da is compensated for by an increase in the correction amount Δθ for the relative displacement of the rack shaft 20 relative to the housing 40 in the axial direction Da. In other words, the error in control of the steered angle θp is reduced.

The above-described present embodiment produces effects described below.

(1) The target steered angle θp1* is corrected so as to increase the rack axial force AF. Consequently, even when the housing 40 is displaced relative to the vehicle body, the relative displacement of the rack shaft 20 relative to the vehicle body can be accurately controlled. Thus, the steering operation control of the steered wheels can be maintained at a high level. This allows suppression of the adverse effect of a technique for fixing the housing 40 to the vehicle body on a phenomenon resulting from execution of steering operation control on the steered wheels 26.

(2) With power transmission between the steering wheel 10 and the steered wheels 26 blocked by the clutch 14, the target steered angle θp1* is corrected. This allows avoidance of a situation where an unintended force is exerted on the steering wheel 10 as a result of steering operation control of the steered wheels 26 involved in correction of the target steered angle θp1*.

(3) The rack axial force AF is calculated based on the currents iu, iv, and iw, which flow through the steering operation motor 34 and which are parameters utilized to control the steering operation motor 34. This eliminates the need to add new hardware to acquire the rack axial force AF.

(4) The housing 40 is fixed to the vehicle body via the bush 50 with the rubber 56. In this case, an increased rack axial force AF may cause the housing 40 itself to be displaced relative to the vehicle body. When the housing 40 is displaced relative to the vehicle body, the actual steered angle of the steered wheels 26 is small considering the relative displacement of the rack shaft 20 relative to the housing 40. Such a situation can be suppressed by correcting the target steered angle θp1* so as to increase the rack axial force AF.

Now, a second embodiment of the steering control apparatus in the invention will be described with reference to the drawings with differences from the first embodiment focused on.

Figure 6:
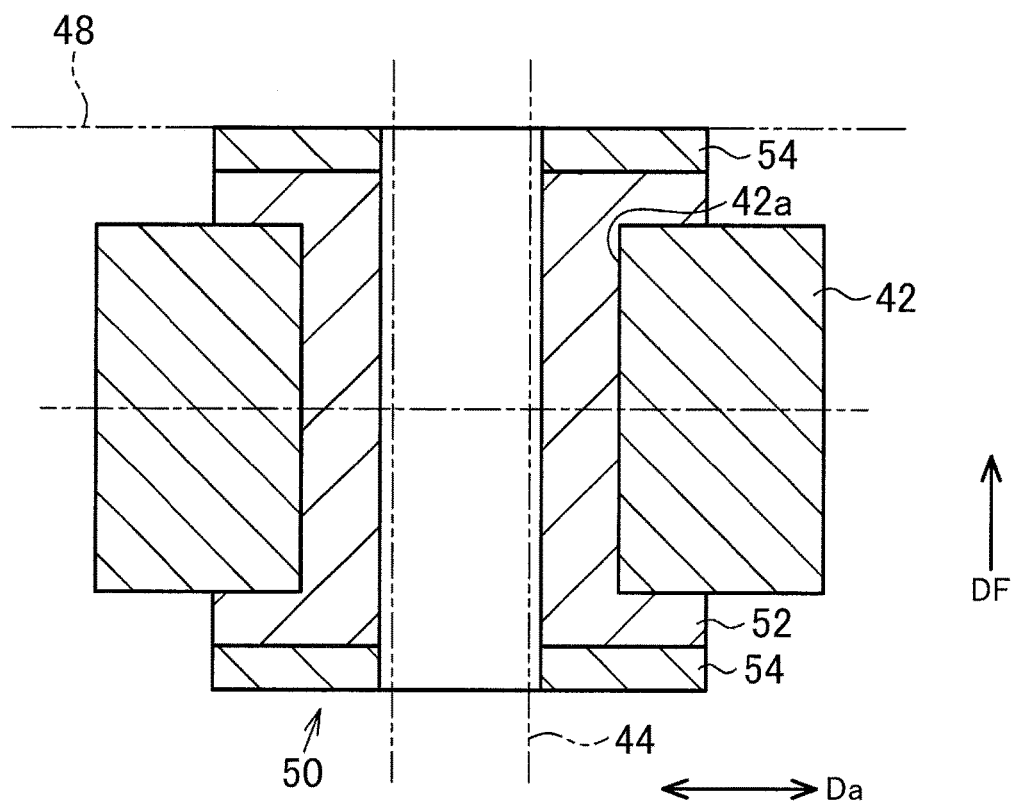
FIG. 6 is a sectional view depicting a sectional configuration of a mount portion of a housing according to a second embodiment.

FIG. 6 depicts a sectional configuration of the mount portion 42. Corresponding members in FIG. 6 and FIG. 2 are denoted by the same reference numerals for convenience. As depicted in FIG. 6, in the present embodiment, the rubber 56 is omitted from the bush 50, and the tubular portion 52 is in contact with an inner peripheral surface 42a of the mount portion 42. In this case, even if the rack axial force AF is large, relative displacement of the housing 40 relative to the vehicle body is sufficiently suppressed as is the case with the first embodiment. However, in this case, if the steering wheel 10 is abruptly turned to the right or to the left, the rack axial force AF increases to impact the vehicle, resulting in noise that is likely to be sensed by the user.

Thus, in the present embodiment, the target steered angle θp1* is corrected so as to reduce the rack axial force AF on condition that the vehicle speed V is equal to or lower than a specified speed Vth. In other words, the relative displacement, from the neutral position, of the rack shaft 20 relative to the housing 40 in the axial direction Da is corrected so as to reduce the rack axial force AF. The specified speed Vth is set to the upper limit value of a speed at which the user is likely to sense noise caused by impact made on the vehicle as a result of steering operation control of the steered wheels 26.

Figure 7:
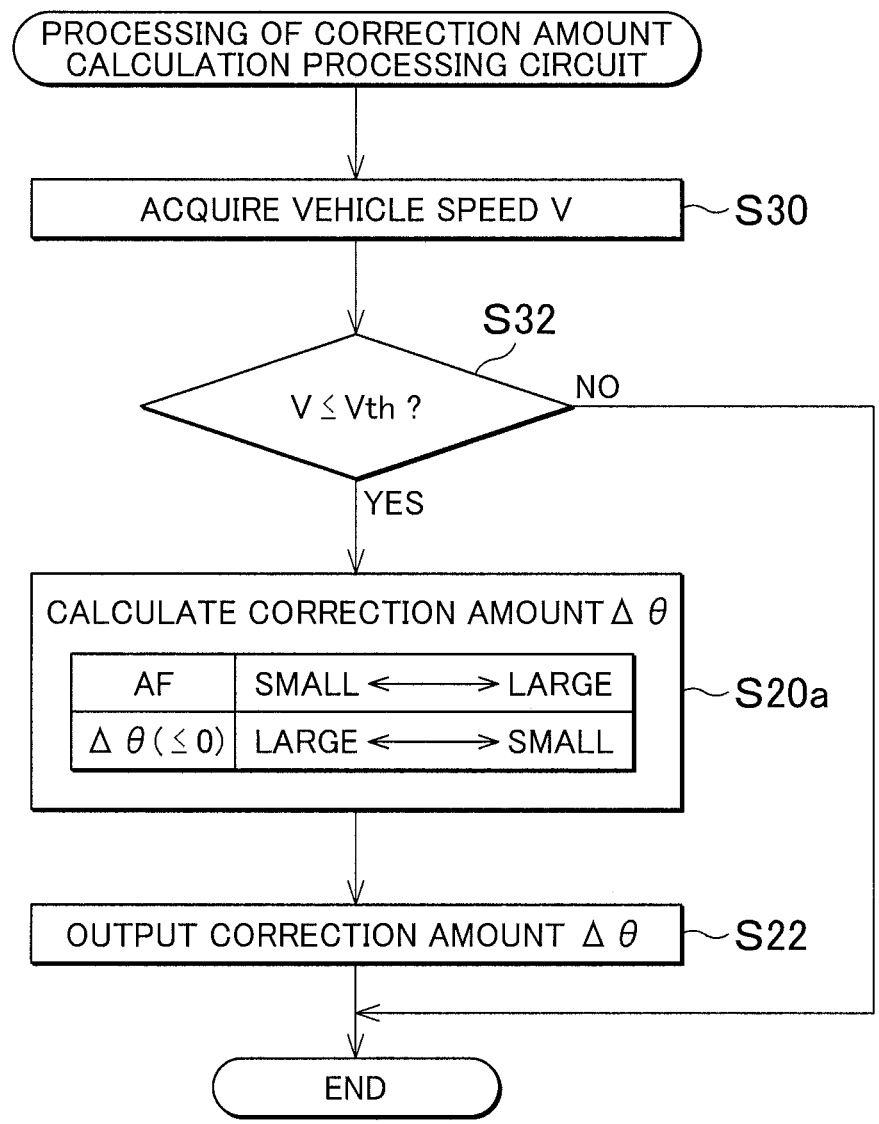
FIG. 7 is a flow diagram illustrating processing of a correction amount calculation processing circuit according to the second embodiment.

FIG. 7 illustrates a procedure of processing of the correction amount calculation processing circuit M44 according to the present embodiment. This processing is repeatedly executed by the correction amount calculation processing circuit M44 with a predetermined period. Corresponding processes in FIG. 7 and FIG. 5 are denoted by the same step numbers for convenience.

In the series of processes illustrated in FIG. 7, the correction amount calculation processing circuit M44 first acquires the vehicle speed V (S30). The correction amount calculation processing circuit M44 determines whether or not the vehicle speed is equal to or lower than the specified speed Vth (S32). Upon determining that the vehicle speed is equal to or lower than the specified speed Vth (S32: YES), the correction amount calculation processing circuit M44 calculates the correction amount Δθ through map calculation based on the rack axial force AF (S20a). The map data utilized in this case sets the correction amount Δθ to a value equal to or smaller than zero when a value at which the rack axial force AF is increased is defined to be positive, and increases the absolute value of the correction amount Δθ as the rack axial force AF increases. The map data is pre-stored in the memory 74. The correction amount Δθ is zero when the rack axial force AF is small.

In addition to the effects (2) and (3) in the first embodiment, the following effects are produced by the above-described present embodiment.

(5) The target steered angle θp1* is corrected so as to reduce the rack axial force AF when the rack axial force AF is large compared to the case where the rack axial force AF is small. This allows cushioning of impact made on the vehicle as a result of steering operation control of the steered wheels 26 and thus enables a reduction in noise involved in impact.

(6) The process of correcting the target steered angle θp1* is executed on condition that the vehicle speed V is equal to or lower than the specified speed Vth. Thus, in a high speed region where noise involved in the steering operation control is unlikely to be sensed by the user, the actual steering operation can be more properly performed on the steered wheels 26 in response to operation of the steering wheel 10.

A third embodiment of the steering control apparatus in the invention will be described with reference to the drawings with differences from the first embodiment focused on.

The present embodiment is not particularly limited in whether to adopt the bush 50 in FIG. 2 or the bush 50 in FIG. 6. In the present embodiment, in the memory 74, a plurality of types of map data are pre-stored which specify a relationship between the rack axial force AF and the correction amount Δθ. Map data to be actually used is determined by acquiring an indication of which of the map data is utilized by the control apparatus 70 before shipment of a vehicle product with the control apparatus 70 mounted therein. In other words, the control apparatus 70 selects one of the patterns with different values of the correction amount Δθ for the same rack axial force AF which pattern is utilized to set the correction amount Δθ. In the present embodiment, the map data stored in the memory 74 includes the map data utilized in step S20 in FIG. 5 and the map data utilized in step S20a in FIG. 7.

Figure 8:
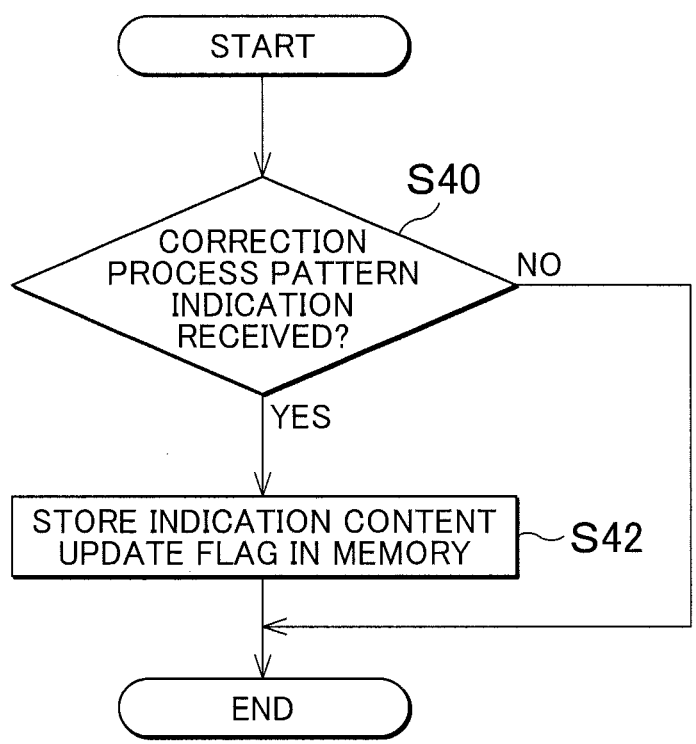
FIG. 8 is a flow diagram illustrating a setting process for a correction processing pattern according to a third embodiment.

FIG. 8 illustrates a procedure of processing executed by the control apparatus 70 before shipment of a vehicle product with the control apparatus 70 mounted therein. This processing is implemented by the CPU 72 executing a program stored in the memory 74 and is performed on condition that the control apparatus 70 is provided with a connector and that a signal input only before shipment of the vehicle, at a dealer, or the like is input to the connector.

In the series of processes, the CPU 72 first determines whether or not the control apparatus 70 has received an indication of a correction process pattern that is an indication of which of the map data is to be used (S40). This is a process of determining whether or not an indication signal has been received through the connector. Upon determining that the indication signal has been received (S40: YES), the CPU 72 updates a flag stored in a storage area at a predetermined address in accordance with the content of the indication (S42). In the storage area at the predetermined address, a flag Fa is stored by default which indicates that the map data utilized in step S20 in FIG. 5 is to be utilized. Thus, if the content of the received indication is indicative of the map data utilized in step S20a in FIG. 7, the CPU 72 updates the flag stored in the storage area at the predetermined address to a flag Fb indicating that the map data utilized in step S20a is to be utilized.

Figure 9:
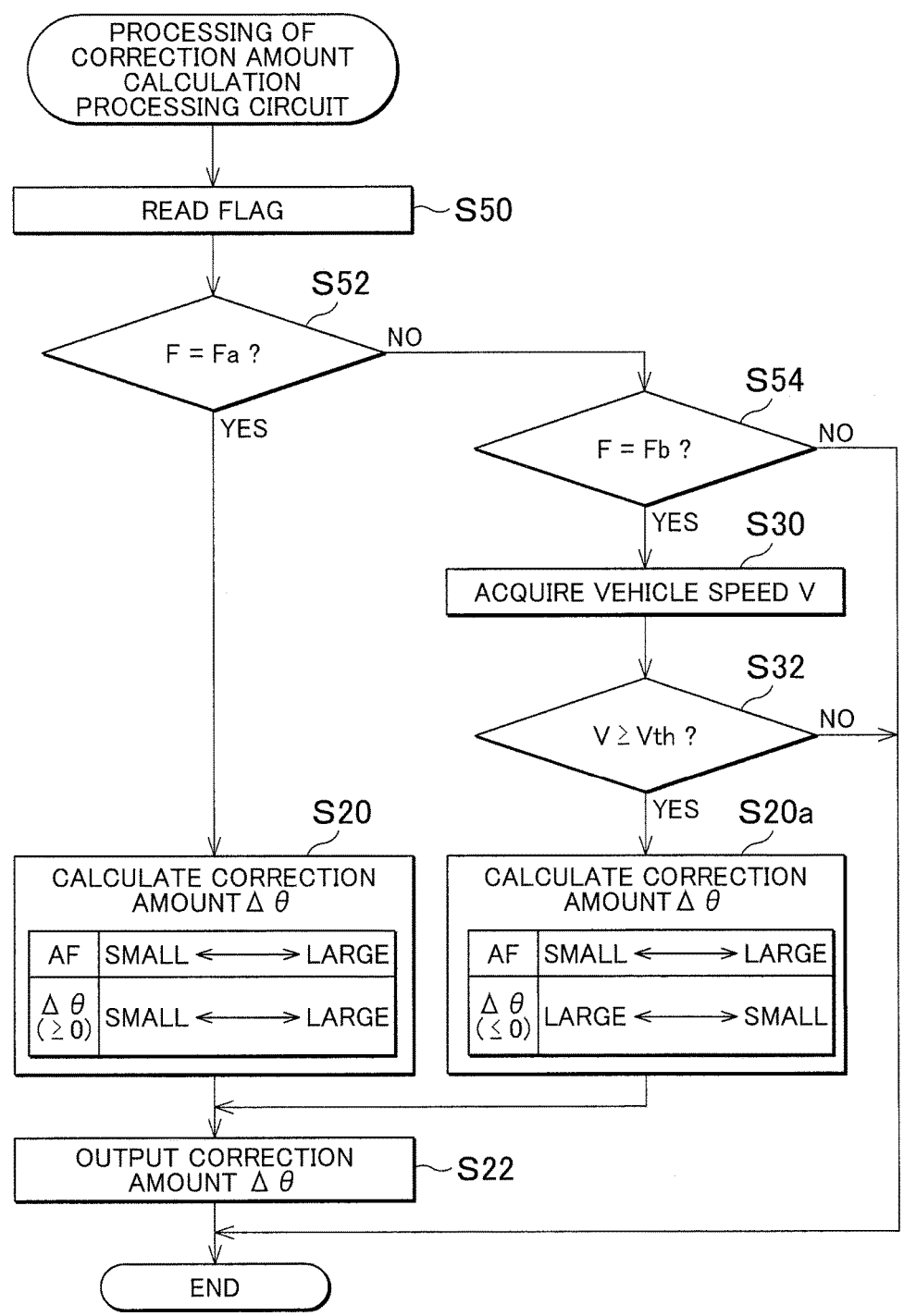
FIG. 9 is a flow diagram illustrating processing of a correction amount calculation processing circuit according to the third embodiment.

FIG. 9 illustrates a procedure of processing of the correction amount calculation processing circuit M44. This processing is repeatedly executed by the correction amount calculation processing circuit M44, for example, with a predetermined period. Corresponding processes in FIG. 9 and FIGS. 5 and 7 are denoted by the same step numbers for convenience.

In the series of processes illustrated in FIG. 9, the correction amount calculation processing circuit M44 first reads the flag stored in the storage area at the predetermined address (S50). Upon determining the read flag to be the flag Fa indicating that the map data utilized in step S20 in FIG. 5 is to be utilized (S52: YES), the correction amount calculation processing circuit M44 executes the processing in steps S20 and S22 in FIG. 5. Upon determining the read flag not to be the flag Fa (S52: NO), the correction amount calculation processing circuit M44 determines whether or not the read data is the flag Fb indicating that the map data utilized in step S20a is to be utilized (S54). Upon determining the read flag to be the flag Fb (S54: YES), the correction amount calculation processing circuit M44 executes processing in steps S30, S32, S20a, and S22 in FIG. 7 as needed. Upon making negative determination in step S54, the correction amount calculation processing circuit M44 may stop outputting the correction amount Δθ or steadily maintains the correction amount Δθ at zero. This is to deal with, for example, an abnormal value of the flag stored in the storage area at the predetermined address.

Now, operation of the present embodiment will be described. Before shipment of a vehicle product, a vehicle manufacturer that mounts the control apparatus 70 in the vehicle indicates whether to utilize the map data utilized in step S20 in FIG. 5 or the map data utilized in step S20a in FIG. 7, in response to a request to the vehicle. In accordance with the indication, the control apparatus 70 stores the flag Fa or the flag Fb in the memory 74. After shipment of the vehicle product, when the flag Fa is stored in the memory 74, the control apparatus 70 executes processing equivalent to the processing illustrated in FIG. 5 in correcting the target steered angle θp1*. When the flag Fb is stored in the memory 74, the control apparatus 70 executes processing equivalent to the processing illustrated in FIG. 7 in correcting the target steered angle θp1*.

In addition to effects similar to the effects of the first embodiment and the effect (5) of the second embodiment, the following effect is produced by the above-described embodiment.

(6) A plurality of map data are stored in the memory 74, and which of the map data is to be utilized can be externally indicated. Consequently, the control apparatus 70 can deal with various requests, allowing versatility of the control apparatus 70 to be improved.

A fourth embodiment of the steering control apparatus in the invention will be described with reference to the drawings with differences from the first embodiment focused on.

Figure 10:
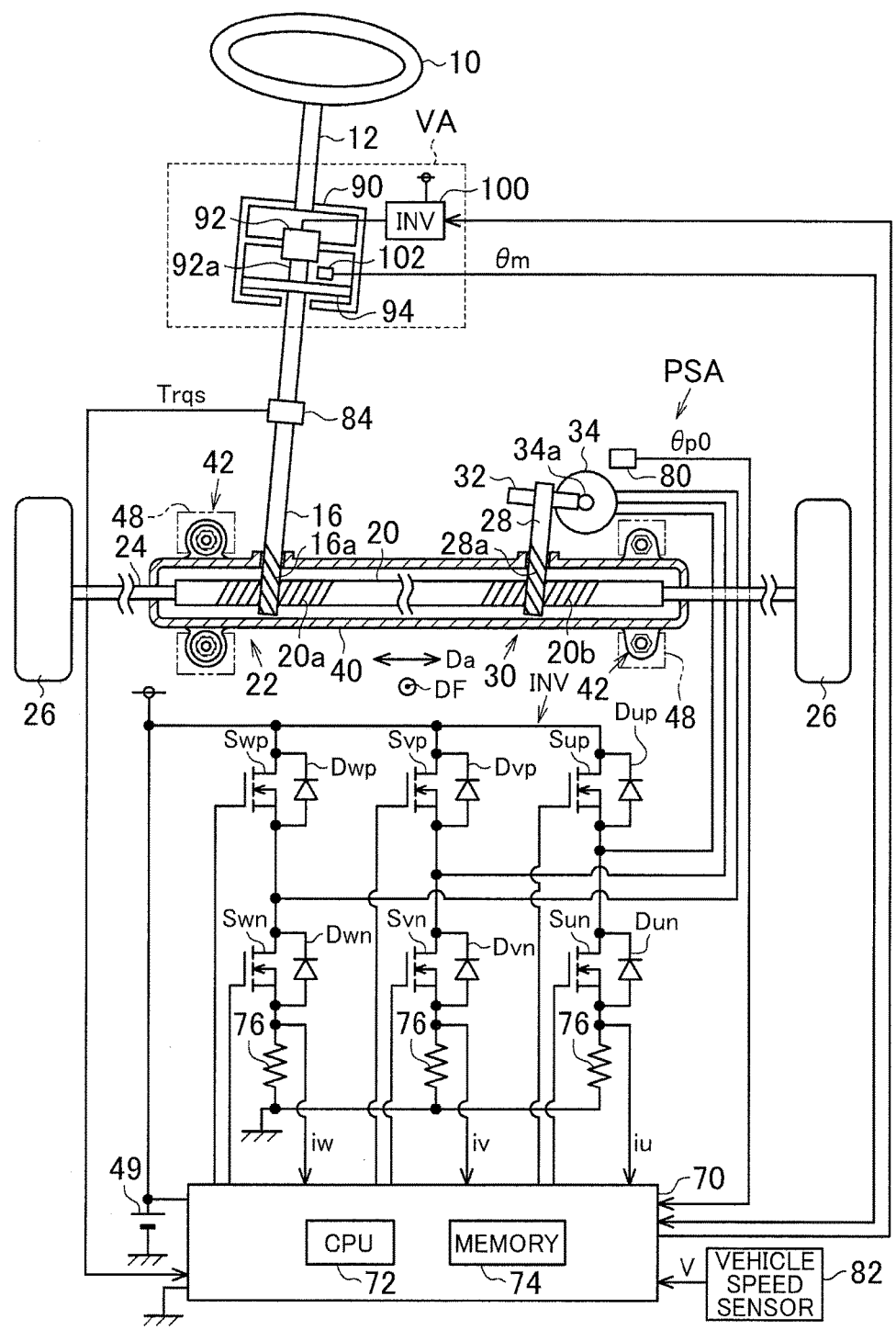
FIG. 10 is a diagram depicting a steering control apparatus and a steering system according to a fourth embodiment.

FIG. 10 depicts a steering control apparatus and a steering system according to the present embodiment. Corresponding members in FIG. 10 and FIG. 1 are denoted by the same reference numerals for convenience. The steering system according to the present embodiment enables a variation, with respect to the same steering angle θs, in a control steering angle ratio that is a ratio between the steering angle θs and the relative displacement of the rack shaft 20 relative to the housing 40 in the axial direction Da while transmitting the steering torque Trqs from the steering wheel 10 to the steered wheels 26.

That is, the steering wheel 10 is connected to a variable-steering-angle-ratio actuator VA. The variable-steering-angle-ratio actuator VA includes a housing 90 coupled to the steering shaft 12 so as to be rotatable integrally with the steering shaft 12, and includes a steering angle ratio varying motor 92, an inverter 100, and a reduction gear mechanism 94 that are housed in the housing 90. The reduction gear mechanism 94 includes a mechanism of three rotating elements that can make differential rotations, for example, a planetary gear mechanism or strain wave gearing. The three rotating elements included in the reduction gear mechanism 94 are coupled to the housing 90, a rotating shaft 92a coupled to a rotating shaft of the steering angle ratio varying motor 92, and the pinion shaft 16. That is, in the reduction gear mechanism 94, a rotation speed of the pinion shaft 16 is unambiguously determined by a rotation speed of the housing 90 and a rotation speed of the steering angle ratio varying motor 92. In the variable-steering-angle-ratio actuator VA, rotation of the rotating shaft 92a of the steering angle ratio varying motor 92 is combined with rotation of the steering shaft 12 resulting from operation of the steering wheel 10, and the resultant rotation is transmitted to the pinion shaft 16 to vary the rotation angle of the pinion shaft 16 relative to the steering shaft 12. Consequently, the control steering angle ratio is variably set. The combination of the rotations may include both addition and subtraction of the rotations. The rotation angle of the pinion shaft 16 with respect to the steering shaft 12 is hereinafter referred to as an operation angle θa of the pinion shaft 16.

A rotation angle sensor 102 detects a rotation angle θm of the rotating shaft 92a of the steering angle ratio varying motor 92. The torque sensor 84 detects the torque of the pinion shaft 16 as the steering torque Trqs.

Figure 11:
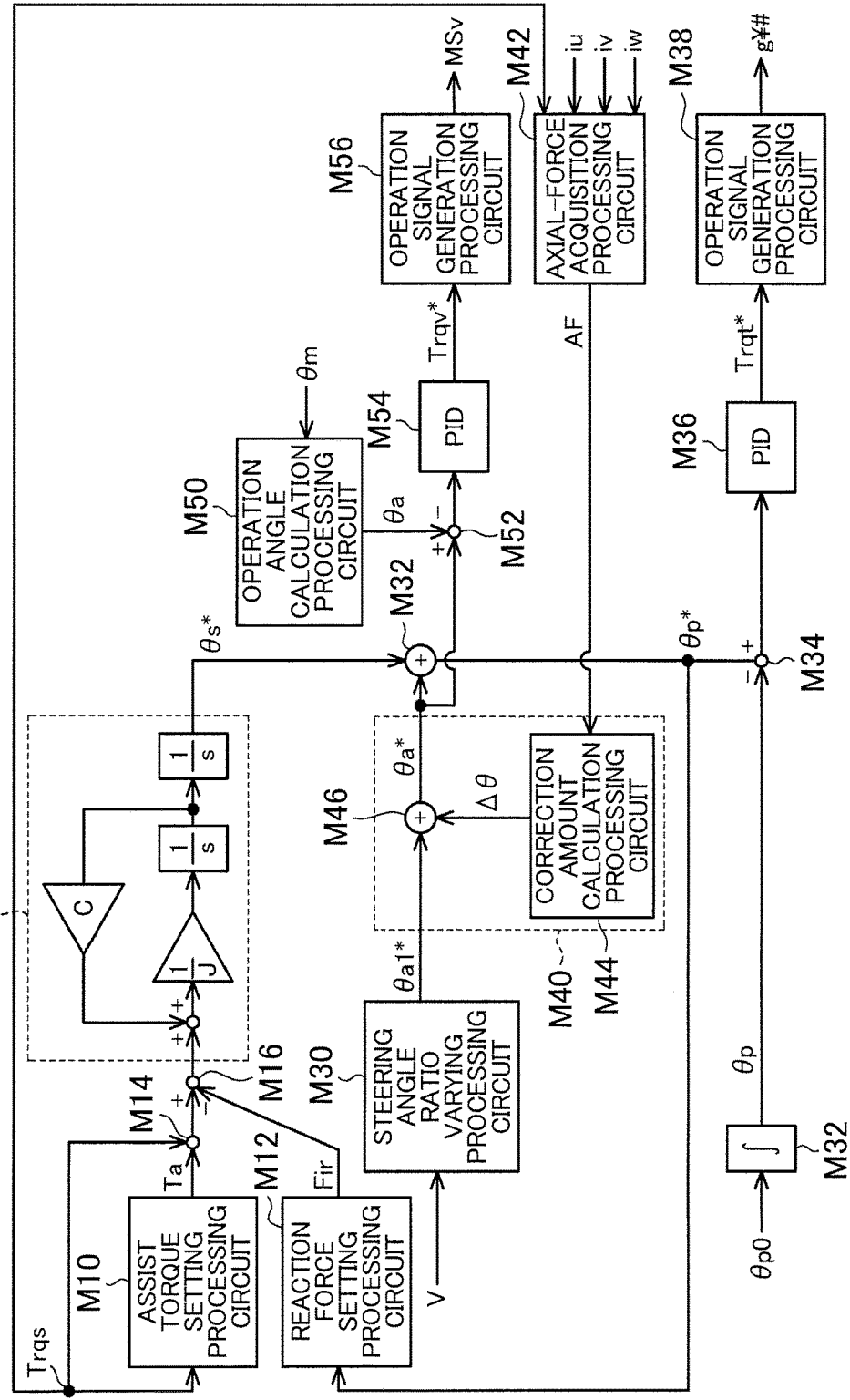
FIG. 11 is a block diagram depicting a part of processing executed by the steering control apparatus according to the fourth embodiment.

FIG. 11 illustrates a part of processing executed by the control apparatus 70. FIG. 11 illustrates processing implemented by the CPU 72 executing a program stored in the memory 74, according to the type of process. Corresponding members in FIG. 11 and FIG. 3 are denoted by the same reference numerals for convenience.

Figure 12:
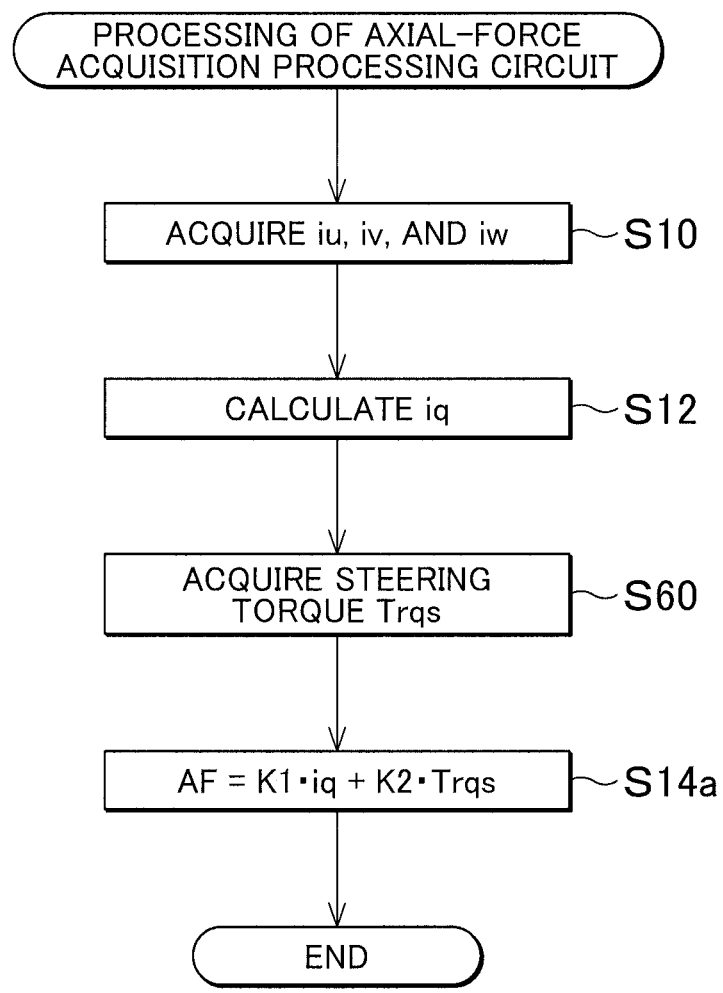
FIG. 12 is a flow diagram illustrating processing of an axial-force acquisition processing circuit according to the fourth embodiment.

The axial-force acquisition processing circuit M42 loads the steering torque Trqs in addition to the currents iu, iv, and iw. FIG. 12 illustrates a procedure of processing of the axial-force acquisition processing circuit M42 according to the present embodiment. This processing is repeatedly executed by the axial-force acquisition processing circuit M42 with a predetermined period. Corresponding processes in FIG. 12 and FIG. 4 are denoted by the same step numbers for convenience.

In the series of processes illustrated in FIG. 12, the axial-force acquisition processing circuit M42 calculates the current iq for the q axis and then acquires the steering torque Trqs (S60). The axial-force acquisition processing circuit M42 then calculates the rack axial force AF to be K1·iq+ K2·Trqs (S14a). A coefficient K2 allows the torque applied to the pinion shaft 16 to be converted into a force applied to the rack shaft 20. In the present embodiment, the torque applied to the pinion shaft 16 is transmitted to the rack shaft 20, and thus, the rack axial force AF is calculated based not only on the current iq for the q axis but also on the steering torque Trqs.

As seen back in FIG. 11, the correction amount calculation processing circuit M44 calculates the correction amount Δθ based on the rack axial force AF calculated by the axial-force acquisition processing circuit M42, and outputs the correction amount Δθ to the addition processing circuit M46. On the other hand, the steering angle ratio varying processing circuit M30 outputs a target operation angle θa1* according to the vehicle speed V. The target operation angle θa1* is basically set similarly to the target operation angle θa1* in the first embodiment.

The addition processing circuit M46 calculates a target operation angle θa* by adding the correction amount Δθ to the target operation angle θa1*, and outputs the target operation angle θa*. An operation angle calculation processing circuit M50 calculates an actual operation angle θa of the pinion shaft 16 from the rotation angle θm based on a speed reducing ratio determined by a rear ratio between the rotating elements included in the reduction gear mechanism 94.

A deviation calculation processing circuit M52 outputs a value resulting from subtraction of the operation angle θa from the target operation angle θa*. The steering angle ratio control processing circuit M54 calculates a steering angle ratio torque Trqv* as the amount of operation for adjusting the operation angle θa to the target operation angle θa* through feedback control. Specifically, the steering angle ratio torque Trqv* is the sum of output values from a proportional element, an integral element, and a derivative element to which the value resulting from subtraction of the operation angle θa from the target operation angle θa* is input.

An operation signal generation processing circuit M56 generates an operation signal MSv for the inverter 100 to controllably make the torque of the steering angle ratio varying motor 92 equal to the steering angle ratio torque Trqv*. This can be executed similarly to the generation process for the operation signal by the operation signal generation processing circuit M26.

The correction amount Δθ has a value at which the rack axial force AF is increased as is the case with the first embodiment. The addition processing circuit M32 calculates the target steered angle θp* by adding the target operation angle θa* to the target steering angle θs*.

In addition to the effects (1) and (4) of the first embodiment, the following effects are produced by the above-described embodiment.

(7) The control amount (target operation angle θa1*) resulting from operation of the variable-steering-angle-ratio actuator VA is corrected using the correction amount Δθ. Consequently, when the target value (target steered angle θp1*) of the relative displacement of the rack shaft 20 relative to the housing 40 in the axial direction Da is corrected and the relative displacement is controllably adjusted to the corrected target value (target steered angle θp*), imposition of an unintended torque on the steering wheel 10 can be suitably suppressed.

(8) The rack axial force AF is calculated based on the currents iu, iv, and iw, flowing through the steering operation motor 34 and used to control the steering operation motor 34, and the steering torque Trqs utilized to set the assist torque. This allows avoidance of provision of new hardware for calculating the rack axial force AF.

A fifth embodiment of the steering control apparatus in the invention will be described with reference to the drawings with differences from the first embodiment focused on.

Figure 13:
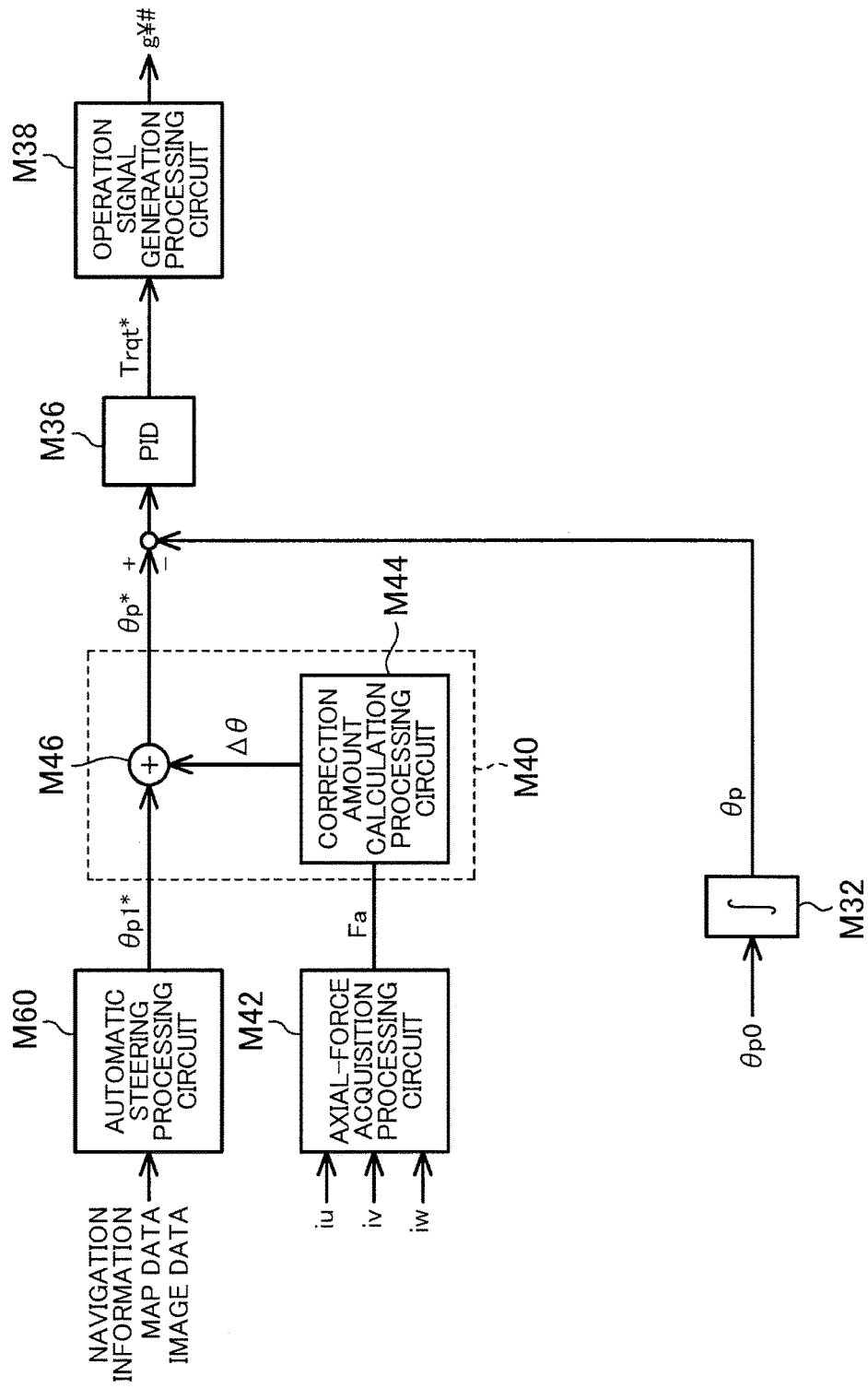
FIG. 13 is a block diagram depicting a part of processing executed by the steering control apparatus according to the fifth embodiment.

In the present embodiment, an automatic steering process is executed in which steering operation control is performed on the steered wheels 26 independently of operation of the steering wheel 10. FIG. 13 illustrates a part of processing executed by the control apparatus 70. FIG. 13 illustrates processing implemented by the CPU 72 executing a program stored in the memory 74, according to the type of process. Corresponding members in FIG. 13 and FIG. 3 are denoted by the same reference numerals for convenience. The processing illustrated in FIG. 13 is executed during the automatic steering process by the control apparatus 70.

An automatic steering processing circuit M60 calculates and outputs a command value for the automatic steering process of steering the steered wheels 26 independently of operation of the steering wheel 10. Specifically, the target value (target steered angle θp1*) for the relative displacement of the rack shaft 20 relative to the housing 40 in the axial direction Da, which is necessary for automatic steering, is calculated and output based on various detection values. This may be implemented, for example, as follows.

That is, first, a target trajectory for vehicle traveling is set based on navigation information on traveling of the vehicle, map data, and image data. This can be executed by recognizing white lines defining traffic lanes, for example, based on the image data. Specifically, the target trajectory may be, for example, a trajectory of a representative point on the vehicle and may be obtained by setting the trajectory of the representative point near the center of a traffic lane. Then, based on the target trajectory and the vehicle speed V, the target steered angle θp1* is set to be the relative displacement that allows the target trajectory to be achieved. However, the target steered angle θp1* is not limited to a value determined based only on the amount of open loop operation performed to controllably align the trajectory with the target trajectory. For example, based on the target trajectory, a yaw rate or a yaw angle of the vehicle, the amount of shift from the center of a traffic lane, or the like may be used as a feedback control amount. Then, the target steered angle, serving as the amount of open loop operation, may be corrected using the amount of operation for controllably adjusting the feedback control amount to a target value. The resultant target steered angle may be the final target steered angle θp1*.

The addition processing circuit M46 calculates the target steered angle θp* by adding the correction amount Δθ output by the correction amount calculation processing circuit M44 to the target steered angle θp1*, and outputs the target steered angle θp*. The steered angle control processing circuit M36 sets the torque command value Trqt* that is a command value for the torque generated by the steering operation motor 34, as the amount of operation for adjusting the steered angle θp to the target steered angle θp* through feedback control.

Now, operation of the present embodiment will be described. The automatic steering processing circuit M60 calculates and outputs the appropriate target steered angle θp1* for allowing the vehicle to travel properly. The target steered angle θp1* is corrected by the addition processing circuit M46 so as to increase the rack axial force AF based on the correction amount Δθ. If correction based on the correction amount Δθ is not performed when the rack axial force AF is large, the relative displacement of the rack shaft 20 relative to the vehicle body in the axial direction Da may be reduced, leading to a situation where the steered wheels 26 fail to be steered as set by the automatic steering processing circuit M60 in terms of an actual steered amount of the steered wheels 26. In contrast, the target steered angle θp1* is corrected based on the correction amount Δθ to allow steering of the steered wheels 26 to be made similar to steering targeted by the automatic steering processing circuit M60.

In addition to the effects (1), (3), and (4) of the first embodiment, the following effects are produced by the above-described embodiment.

(9) Even if the housing 40 is displaced relative to the vehicle body in the axial direction Da, correction of the target steered angle θp1* allows suitable suppression of a situation where the actual steering of the steered wheels 26 deviates from the steering of the steered wheels 26 expected by the automatic steering processing circuit M60 setting the target steered angle θp1*. Therefore, the automatic steering processing circuit M60 allows steering operation control to be more properly achieved.

At least one of the matters of the above-described embodiments may be modified as follows. The control steering angle ratio in SUMMARY OF THE INVENTION corresponds to the ratio between the steering angle θs and the steered angle θp in the first to fourth embodiments. The indication acquisition processing circuit corresponds to the CPU 72, which executes the processing in FIG. 8 in accordance with the program stored in the memory 74. The steering operation processing circuit corresponds to the deviation calculation processing circuit M34, the steered angle control processing circuit M36, and the operation signal generation processing circuit M38. The steering angle operation processing circuit corresponds to the deviation calculation processing circuit M52, the steering angle ratio control processing circuit M54, and the operation signal generation processing circuit M56. The target value of the control steering angle ratio corresponds to the ratio between the target steering angle θs* and θs*+θa1*. The steering torque acquisition processing circuit corresponds to the CPU 72 executing the processing in step S60 in accordance with the program stored in the memory 74.

For the correction processing circuit (M40), (a) the patterns are not limited to the pattern defined by the map data utilized for the processing in step S20 and the pattern defined by the map data utilized for the processing in step S20a. For example, two or more values of the correction amount Δθ may be set, which increases the rack axial force AF and has an absolute value that is larger when the rack axial force AF is large than when the rack axial force AF is small and which is determined based on one value of the rack axial force AF. In other words, two or more patterns may be set which allow correction so as to increase the rack axial force AF. Alternatively, for example, two or more values of the correction amount Δθ may be set that reduce the rack axial force AF and each have an absolute value that is larger when the rack axial force AF is large than when the rack axial force AF is small and are each determined based on one value of the rack axial force AF. In other words, two or more patterns may be set which allow correction so as to reduce the rack axial force AF. These matters can be achieved by providing two or more types of map data. Moreover, for example, three or more values of the correction amount Δθ may be set which are each a mixture of a value allowing correction so as to increase the rack axial force AF and a value allowing correction so as to reduce the rack axial force AF and each determined based on one value of the rack axial force AF. This can be achieved by providing three or more types of map data.

(b) For the acquisition process for the indication signal (FIG. 8), the above-described embodiments disclose, by way of example, that the CPU 72 executes the processing in FIG. 8 once before shipment of the vehicle with the control apparatus 70 mounted therein. However, the invention is not limited to this. For example, the CPU 72 may execute the processing illustrated in FIG. 8 with a predetermined period even after shipment of the vehicle. In this case, for example, an operation member may be mounted in the vehicle to allow the user to specify preferred behavior of the vehicle so that, each time the user operates the operation member to specify a vehicle behavior corresponding to a particular pattern, the CPU 72 can make affirmative determination in step S40 and execute the processing in step S42 based on an indication signal based on the operation. (c) In the first embodiment or the third embodiment, the absolute value of the correction amount Δθ gradually increases as the rack axial force AF increases. However, the invention is not limited to this. For example, a plurality of thresholds for the rack axial force AF may be set so that, each time each of the thresholds is exceeded, the absolute value of the correction amount Δθ may be increased in stages. Instead of the plurality of thresholds, a single threshold may be used.

In the second embodiment and the third embodiment, when the vehicle speed V is equal to or lower than the specified speed Vth, the absolute value of the correction amount Δθ is increased as the rack axial force AF increases. However, the invention is not limited to this. For example, a plurality of thresholds for the rack axial force AF may be set so that, each time each of the thresholds is exceeded, the absolute value of the correction amount Δθ may be increased in stages. Instead of the plurality of thresholds, a single threshold may be used. For example, correction based on the correction amount Δθ may be performed regardless of whether or not the vehicle speed V is equal to or lower than the specified speed Vth.

In the fourth embodiment, the bush 50 in FIG. 6 may be adopted, and the processing of the correction amount calculation processing circuit M44 may be the processing in FIG. 7. The processing of the correction amount calculation processing circuit M44 may be the processing in FIG. 9 regardless of whether the bush 50 in FIG. 2 is adopted or the bush 50 illustrated in FIG. 6 is adopted. Consequently, the effect (6) in the third embodiment can be produced.

In the fifth embodiment, the bush 50 in FIG. 6 may be adopted, and the processing of the correction amount calculation processing circuit M44 may be the processing in FIG. 7. The processing of the correction amount calculation processing circuit M44 may be the processing in FIG. 9 regardless of whether the bush 50 in FIG. 2 is adopted or the bush 50 illustrated in FIG. 6 is adopted. When the processing in FIG. 9 is adopted as described above, the behavior of the vehicle based on automatic steering may be appropriate for the vehicle with the control apparatus 70 mounted therein.

The invention is not limited to addition of the correction amount Δθ. For example, a correction process involving multiplication by a correction coefficient may be executed. In this case, a difference resulting from multiplication by the correction coefficient corresponds to the correction amount Δθ.

For the relative displacement (θp) and the target value of the relative displacement (θp1*; θp1*+θa1*), in the fourth embodiment (FIG. 11), the target operation angle θa1* output from the steering angle ratio varying processing circuit M30 and input to the addition processing circuit M32 is corrected by the correction processing circuit M40 using the correction amount Δθ. However, the invention is not limited to this. For example, both the output value from the addition processing circuit M32 and the output value from the steering angle ratio varying processing circuit M30 input to the deviation calculation processing circuit M52 may be corrected by the correction processing circuit M40 using the correction amount Δθ. In this case, the correction target for the correction amount Δθ is θp1*+θa1* output by the addition processing circuit M32 and the target operation angle θa1*. The correction target may be considered to be the target value of the control steering angle ratio, which is the ratio between the target steering angle θs* and the target value (θp1*+θa1*) of the relative displacement.

The relative displacement is not limited to the rotation angle (steered angle θp) of the pinion shaft 28. For example, the steering operation actuator of a rack parallel type may be adopted. When the steering operation actuator transmits power from the steering operation motor to the rack shaft via a pulley, the relative displacement may be the rotation angle of a rotor that is rotated by power from the steering operation motor 34 via the pulley and that transmits rotary power to the rack shaft 20.

For the target value setting processing circuit, in the first to fourth embodiments, the target value setting processing circuit includes the assist torque setting processing circuit M10, the reaction force setting processing circuit M12, the addition processing circuit M14, the deviation calculation processing circuit M16, the target angle setting processing circuit M18, the steering angle ratio varying processing circuit M30, and the addition processing circuit M32. For example, the output value from the target angle setting processing circuit M18 may be the target steered angle θp1*, and the steering angle ratio varying processing circuit M30 and the addition processing circuit M32 may be omitted from the target value setting processing circuit, which may thus include the assist torque setting processing circuit M10, the reaction force setting processing circuit M12, the addition processing circuit M14, the deviation calculation processing circuit M16, and the target angle setting processing circuit M18. However, in this case, the model utilized by the target angle setting processing circuit M18 is a model related to the steered angle. In the first to third embodiments, the target steered angle θp* is corrected using the output value from the steering angle ratio varying processing circuit M30 in a subtractive manner to obtain the target steering angle θs*.

The target angle setting processing circuit M18 is not limited to the use of Equation (c1) described above. For example, a model may be provided which receives the target steered angle θp* as an input and which calculates a torque proportional to the steered angle according to, for example, specifications of vehicle suspension and the like or wheel alignment. A process may further be executed to correct the input to the target angle setting processing circuit M18 using the output value from the model in a subtractive manner.

When a variation of the fourth embodiment includes a variable-steering-angle-ratio actuator, the following may be omitted from the target value setting processing circuit: the assist torque setting processing circuit M10, the reaction force setting processing circuit M12, the addition processing circuit M14, the deviation calculation processing circuit M16, the target angle setting processing circuit M18, and the addition processing circuit M32. In other words, the target value setting processing circuit may be the steering angle ratio varying processing circuit M30. That is, in this case, the target value of the control steering angle ratio is the ratio between the steering angle θs and the steering angle θs to which the target operation angle θa1* has been added, and the process of setting the target operation angle θa1* is considered to be a process of setting the target value of the control steering angle ratio.

Control performed when the variable-steering-angle-ratio actuator is provided is not limited to the processing illustrated in FIG. 11. For example, a relationship between the steering torque Trqs and the assist torque Ta may be set so as to allow the assist torque Ta to be set according to the steering torque Trqs so that the torque of the steering operation motor 34 is controllably made equal to the assist torque. In this case, the parameter target steered angle θp* is not present, and thus, the target operation angle θa* is simply corrected using the correction amount Δθ. Similarly, in a steering system with no steering operation actuator, the parameter target steered angle θp* is not present, and thus, the target operation angle θa* is simply corrected using the correction amount Δθ.

For the axial-force acquisition processing circuit M42, in the first to third and fifth embodiments, the torque of the steering operation motor 34 is estimated based on the detection values of the currents iu, iv, and iw flowing through the steering operation motor 34, and the rack axial force AF is calculated based on the estimated torque. However, the invention is not limited to this. For example, the torque command value Trqt* may be used as an input so as to allow the rack axial force AF to be calculated based on the torque command value Trqt*. The final rack axial force AF may be the average value of the rack axial force AF calculated based on the detection values of the currents iu, iv, and iw and the rack axial force AF calculated based on the torque command value Trqt*.

In the fourth embodiment, the rack axial force AF is calculated based on the steering torque Trqs and the detection values of the currents iu, iv, and iw flowing through the steering operation motor 34. However, the invention is not limited to this. For example, the rack axial force AF may be calculated based on the torque command value Trqt* and the steering torque Trqs. For example, the rack axial force AF may be calculated based on the steering torque Trqs and the average value of the torque command value Trqt* and the torque calculated based on detection values of the currents iu, iv, and iw.

The axial-force acquisition processing circuit is not limited to calculation of an axial force from a torque or a current. For example, an axial-force sensor that is a strain gauge may be provided on the rack shaft 20, and the axial-force acquisition processing circuit may execute a process of acquiring an output value from the sensor.

The steering operation actuator (PSA) is not limited to the actuator of a pinion assist type. For example, a rack cross type, a rack parallel type, or a rack coaxial type actuator may be adopted. The steering operation motor 34 is not limited to the SPMSM but may be an IPMSM. In this case, when the torque is calculated from the currents iu, iv, and iw, a d-axis current is utilized and reluctance torque is taken into account.

For the regulation member (40), the housing 40 is not limited to the configuration in which the two mount portions are provided at each of the opposite ends of the housing 40 in the axial direction Da. For example, one mount portion may be provided at each of the opposite ends of the housing 40 in the axial direction Da.

The regulation member is not limited to the housing 40 that covers the rack shaft 20. Any regulation member may be used so long as the regulation member regulates displacement of the rack shaft 20 in the direction crossing the axial direction Da while permitting the relative displacement of the rack shaft 20 in the axial direction Da.

The steering system is not limited to the configuration that enables a variation in steering angle ratio, which is the ratio between the steered angle of the steered wheels 26 and the steering angle of the steering wheel 10. For example, even when the configuration depicted in FIG. 1 is changed to a configuration in which the steering shaft 12 is integrated with the pinion shaft 16, controllability of the steered angle θp can advantageously be enhanced when the target value of the steered angle θp based on the automatic steering process is corrected according to the rack axial force AF, compared to the case where the rack axial force AF is not taken into account.

The steering control apparatus is not limited to the configuration including the CPU 72 and the memory 74 to execute software processing. For example, at least a portion of the software processing in the above-described embodiments may be executed using dedicated hardware (ASIC). That is, for example, in the first embodiment, hardware may be used to execute the processing of the assist torque setting processing circuit M10, the reaction force setting processing circuit M12, the addition processing circuit M14, the deviation calculation processing circuit M16, and the target angle setting processing circuit M18. The CPU 72 may acquire the target steering angle θs* from the hardware.

What is claimed is:

1. A steering control apparatus for use with a steering system including a steering operation actuator that steers steered wheels of a vehicle by displacing a rack shaft in an axial direction relative to a regulation member, the regulation member fixed to a vehicle body to regulate displacement of the rack shaft in a direction crossing the axial direction while permitting relative displacement of the rack shaft in the axial direction, the steering control apparatus comprising:
   a target value setting processing circuit that sets a target value for relative displacement of the rack shaft relative to the regulation member in the axial direction;
   an axial-force acquisition processing circuit that acquires a rack axial force acting as a load imposed on the rack shaft in the axial direction;
   a correction processing circuit that corrects the target value based on the rack axial force acquired by the axial-force acquisition processing circuit; and
   a steering operation processing circuit that operates the steering operation actuator in order to control relative displacement of the rack shaft relative to the regulation member in the axial direction so that the displacement is equal to the target value corrected by the correction processing circuit, wherein
   the steering operation actuator includes a steering operation motor that displaces the rack shaft relative to the regulation member in the axial direction,
   the correction processing circuit has a plurality of patterns among which at least one of a magnitude and a sign of the correction amount for the target value of the relative displacement varies with respect to a predetermined value of the rack axial force, and sets the correction amount for the target value of the relative displacement based on one of the patterns,
   the correction processing circuit includes an indication acquisition processing circuit that acquires a designation signal designating one of the patterns, and
   the correction processing circuit selects one of the patterns that is utilized to set the correction amount for the target value of the relative displacement based on the designation signal acquired by the indication acquisition processing circuit.

2. The steering control apparatus according to claim 1, wherein
   the steering system enables a variation in a steering angle ratio that is a ratio between a steered angle of the steered wheels and a steering angle that is a rotation angle of a steering shaft to which a steering wheel is coupled,
   the target value setting processing circuit sets the target value based on operation of the steering wheel, and
   when the target value is corrected by the correction processing circuit, a control steering angle ratio that is a ratio between the steering angle and the relative displacement is varied compared to the case where the target value is not corrected by the correction processing circuit.

3. The steering control apparatus according to claim 2, wherein
the steering system enables blockage of power transmission between the steering wheel and the steered wheels, and
the correction processing circuit corrects the target value while the power transmission between the steered wheels and the steering wheel is blocked.

4. The steering control apparatus according to claim 2, wherein
the steering system includes a variable-steering-angle-ratio actuator that varies a control steering angle ratio that is a ratio between the steering angle and the relative displacement while transmitting a torque applied to the steering shaft to the steered wheels,
the target value setting processing circuit executes a process of setting a target value for the control steering angle ratio as a process of setting a target value for the relative displacement,
the correction processing circuit corrects the target value of the control steering angle ratio, and
the correction processing circuit includes a steering angle operation processing circuit that operates the variable-steering-angle-ratio actuator based on the target value of the control steering angle ratio corrected by the correction processing circuit.

5. The steering control apparatus according to claim 1, wherein
the target value setting processing circuit executes, by setting the target value, an automatic steering process of steering the steered wheels without depending on operation of a steering wheel, and
the correction processing circuit corrects the target value while the automatic steering process is in execution.

6. The steering control apparatus according to claim 3, wherein
the axial-force acquisition processing circuit calculates the rack axial force based on at least one of a torque of the steering operation motor and a current flowing through the steering operation motor.

7. The steering control apparatus according to claim 4, further comprising:
a steering torque acquisition processing circuit that acquires a detection value of a steering torque that is a torque input to the steering shaft, wherein
the axial-force acquisition processing circuit calculates the rack axial force based on at least one of the torque of the steering operation motor and a current flowing through the steering operation motor and based on the steering torque acquired by the steering torque acquisition processing circuit.

8. The steering control apparatus according to claim 1, wherein
the correction processing circuit corrects the target value of the relative displacement so as to increase the rack axial force and increases an absolute value of a correction amount for the target value when the rack axial force is large compared to the case where the rack axial force is small.

9. The steering control apparatus according to claim 8, wherein
the regulation member is fixed to the vehicle body via a bush with a rubber.

10. The steering control apparatus according to claim 1, wherein
the steering system includes a bush that elastically supports the regulation member on the vehicle body, and
the correction processing circuit corrects the target value so as to reduce an error in control of a steered angle of the steered wheels when control is performed to make the relative displacement of the rack shaft relative to the regulation member in the axial direction equal to the target value, the error resulting from relative displacement of the regulation member relative to the vehicle body caused by deflection of the bush.

11. The steering control apparatus according to claim 1, wherein
the correction processing circuit corrects the target value of the relative displacement so as to reduce the rack axial force and increases the absolute value of a correction amount for the target value when the rack axial force is large compared to the case where the rack axial force is small.

12. A steering control apparatus for use with a steering system including a steering operation actuator having a steering operation motor that steers steered wheels of a vehicle by displacing a rack shaft in an axial direction relative to a regulation member, the regulation member fixed to a vehicle body to regulate displacement of the rack shaft in a direction crossing the axial direction while permitting relative displacement of the rack shaft in the axial direction, the steering control apparatus comprising:
a memory storing a plurality of patterns among which at least one of a magnitude and a sign of the correction amount for the target value of the relative displacement varies with respect to a predetermined value of the rack axial force, and
a processor programmed to:
set a target value for relative displacement of the rack shaft relative to the regulation member in the axial direction;
acquire a rack axial force acting as a load imposed on the rack shaft in the axial direction;
acquire a designation signal designating one of the patterns;
select one of the patterns that is utilized to set the correction amount for the target value of the relative displacement based on the acquired designation signal;
correct the target value based on the acquired rack axial force and based on the selected one of the patterns; and
operate the steering operation actuator in order to control relative displacement of the rack shaft relative to the regulation member in the axial direction so that the displacement is equal to the corrected target value.

* * * * *